（12） United States Patent
Kiderman et al.

(10) Patent No.: US 7,119,471 B2
(45) Date of Patent: Oct. 10, 2006

(54) DIRECT DRIVE HIGH TORQUE COMPACT SYNCHRONOUS MOTOR

(75) Inventors: Alexander D. Kiderman, Pittsburgh, PA (US); John Howison Schroeder, Pittsburgh, PA (US); Thomas C. Joos, Pittsburgh, PA (US)

(73) Assignee: Motor Kinetics, Inc., Pittsburgh, PA (US)

( * ) Notice: Subject to any disclaimer, the term of this patent is extended or adjusted under 35 U.S.C. 154(b) by 0 days.

(21) Appl. No.: 10/888,207

(22) Filed: Jul. 9, 2004

(65) Prior Publication Data

US 2005/0012420 A1   Jan. 20, 2005

Related U.S. Application Data

(60) Provisional application No. 60/487,777, filed on Jul. 16, 2003.

(51) Int. Cl.
  *H02K 19/02*   (2006.01)
  *H02K 13/00*   (2006.01)
  *H02K 21/00*   (2006.01)

(52) U.S. Cl. .................. 310/162; 310/232; 310/265; 310/58

(58) Field of Classification Search ........ 310/232, 310/162, 236, 265, 89, 266, 68 R, 128, 129, 310/143, 58–59
See application file for complete search history.

(56) References Cited

U.S. PATENT DOCUMENTS

| 3,628,328 | A | * | 12/1971 | Matsuzawa | 60/307 |
| 5,306,972 | A | * | 4/1994 | Hokanson et al. | 310/58 |
| 5,408,960 | A | * | 4/1995 | Woytowich | 123/142.5 E |
| 5,625,244 | A | * | 4/1997 | Bradfield | 310/232 |
| 5,682,074 | A | * | 10/1997 | Di Pietro et al. | 310/215 |
| 5,744,895 | A | * | 4/1998 | Seguchi et al. | 310/266 |
| 5,751,088 | A | * | 5/1998 | Mukai et al. | 310/239 |
| 5,890,759 | A | * | 4/1999 | Ross | 297/195.13 |
| 5,917,248 | A | * | 6/1999 | Seguchi et al. | 290/31 |
| 6,114,784 | A | * | 9/2000 | Nakano | 310/59 |
| 6,278,206 | B1 | * | 8/2001 | Yockey et al. | 310/71 |
| 6,501,190 | B1 | * | 12/2002 | Seguchi et al. | 290/46 |
| 6,656,137 | B1 | * | 12/2003 | Tyldsley et al. | 601/15 |
| 6,703,740 | B1 | * | 3/2004 | Klode | 310/114 |
| 6,913,390 | B1 | * | 7/2005 | Inoue et al. | 384/476 |
| 6,941,637 | B1 | * | 9/2005 | Fukunaga et al. | 29/596 |

* cited by examiner

*Primary Examiner*—Tran Nguyen
(74) *Attorney, Agent, or Firm*—Blynn L. Shideler; Krisanne Shideler; BLK Law Group

(57) ABSTRACT

A synchronous motor includes a housing 20, a stator assembly 30 mounted within the housing 20, a rotor assembly 40 rotationally mounted within the housing 20, a rotor shaft 50 having an upper mounting surface 52 attached to the rotor assembly 40, a bearing assembly 60 coupled to the housing 20 and positioned axially between the rotor assembly 40 and the upper mounting surface 52, a slip ring assembly 70 supported by the housing 20 and positioned axially at least partially within the stator assembly 30 and the rotor assembly 40, and an encoder assembly 80 adjacent the slip ring assembly 70.

18 Claims, 4 Drawing Sheets

DIRECT DRIVE HIGH TORQUE COMPACT
SYNCHRONOUS MOTOR

RELATED APPLICATIONS

This application claims the benefit of provisional application Ser. No. 60/487,777 entitled "Direct Drive High Torque Compact Synchronous Motor" filed on Jul. 16, 2003 and incorporated herein by reference in its entirety.

BACKGROUND OF THE INVENTION

1. Field of the Invention

We, Alexander Kiderman, Thomas Joos and Howison Schroeder have invented improvements relating to a synchronous motor, and more particularly, directed toward a direct drive, high torque synchronous motor of a compact design, of which the following is a description.

2. Background Information

Direct drive synchronous motors are used in applications where precision positioning or velocity of the object being rotated is required. Synchronous motors for high torque applications are generally large costly motors. There remains a need for a cost effective synchronous motor that is effective for high torque applications and compact in construction.

SUMMARY OF THE INVENTION

The above objects are achieved with a synchronous motor according to the present invention. The present invention is a direct drive synchronous motor includes a housing, a stator assembly mounted within the housing, a rotor assembly rotationally mounted within the housing, a rotor shaft having an upper mounting surface attached to the rotor assembly, a bearing assembly coupled to the housing and positioned axially between the rotor assembly and the upper mounting surface, a slip ring assembly supported by the housing, and an encoder assembly adjacent the slip ring assembly. One feature of the present invention is to axially position the slip ring assembly at least partially within the stator assembly and the rotor assembly to provide a compact construction. Another aspect of the invention is to utilize the rotor assembly to mechanically drive a motor cooling system such as a pump. Another feature of the present invention is to include pivot members on the housing to pivotally mount the motor. The present invention provides a compact, low cost, high torque, direct drive synchronous motor for a variety of applications.

These and other advantages of the present invention will be clarified in the detailed description of the preferred embodiment together with the attached figures in which like reference numerals represent like elements throughout.

DETAILED DESCRIPTION OF THE
PREFERRED EMBODIMENT

Figure 1:
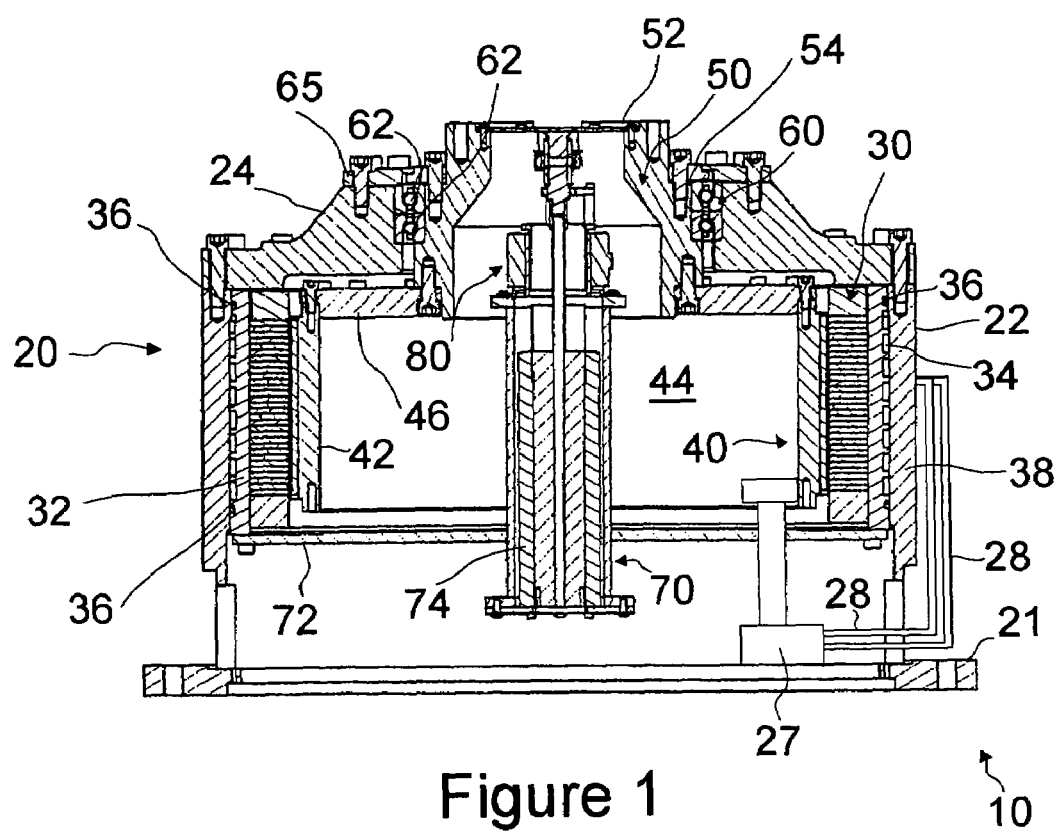
FIG. 1 is a sectional view of a direct drive synchronous motor according to the present invention.
Figure 2:
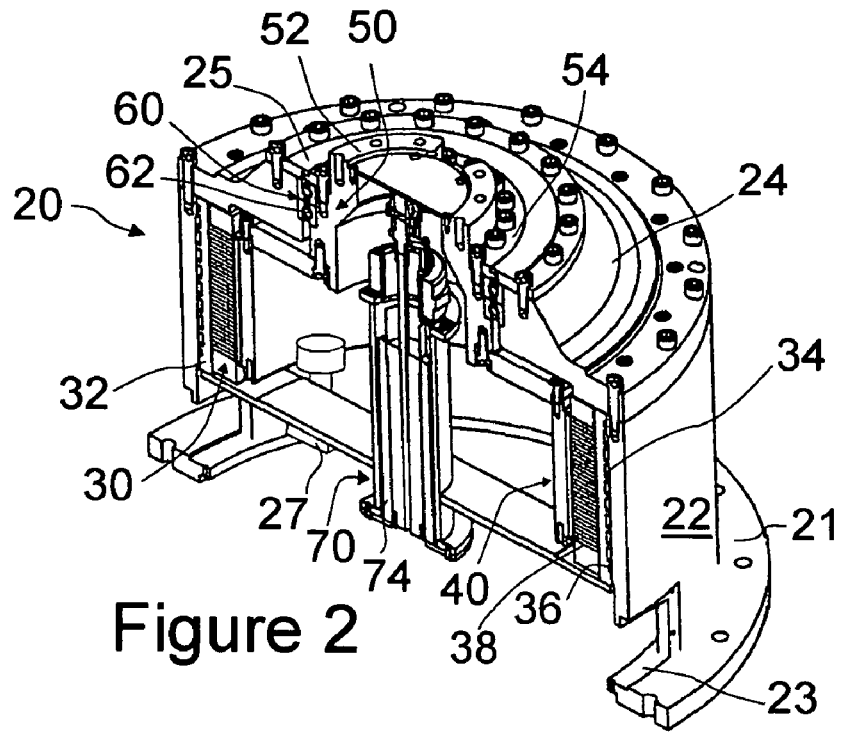
FIG. 2 is a perspective sectional view of the synchronous motor of FIG. 1.
Figure 3:
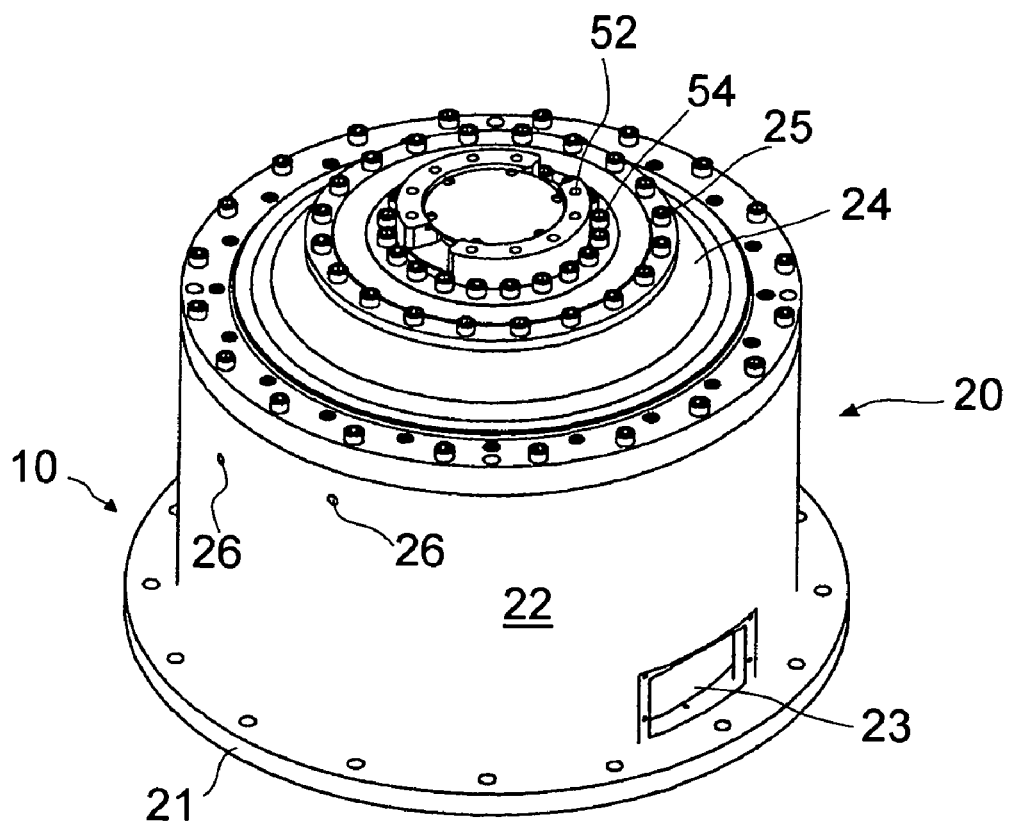
FIG. 3 is a perspective view of the synchronous motor of FIG. 1.

A direct drive synchronous motor 10 according to the present invention is illustrated in FIGS. 1–3 and operates at up to 3000 FT-LBS. The synchronous motor 10 includes a housing 20, a stator assembly 30 mounted within the housing 20, a rotor assembly 40 rotationally mounted within the housing 20, a rotor shaft 50 having an upper mounting surface 52 attached to the rotor assembly 40, a bearing assembly 60 coupled to the housing 20 and positioned axially between the rotor assembly 40 and the upper mounting surface 52, a slip ring assembly 70 supported by the housing 20 and positioned axially at least partially within the stator assembly 30 and the rotor assembly 40, and an encoder assembly 80 adjacent the slip ring assembly 70. The motor 10 is extremely effective through all operative ranges and is particularly effective when compared to direct drive prior art motors at low frequencies (e.g. 0.001) and high accelerations (e.g. 3500 š/sec.$^2$).

The housing 20 is a generally annular structure with a base 21, annular side 22 with access openings 23 on opposed sides thereof. A top or bearing housing 24 is bolted to the side 22 and a bearing retainer 25 is bolted to the bearing housing 24. The side 22 includes two ports 26 for providing cooling fluid to the stator assembly 30. The housing 20 utilizes the compact construction of the motor 10 of the present invention, wherein the outer diameter of the side 22 is about a maximum of 24" and the height of the motor from the base 21 to the mounting surface 52 is less than 20".

Figure 6:
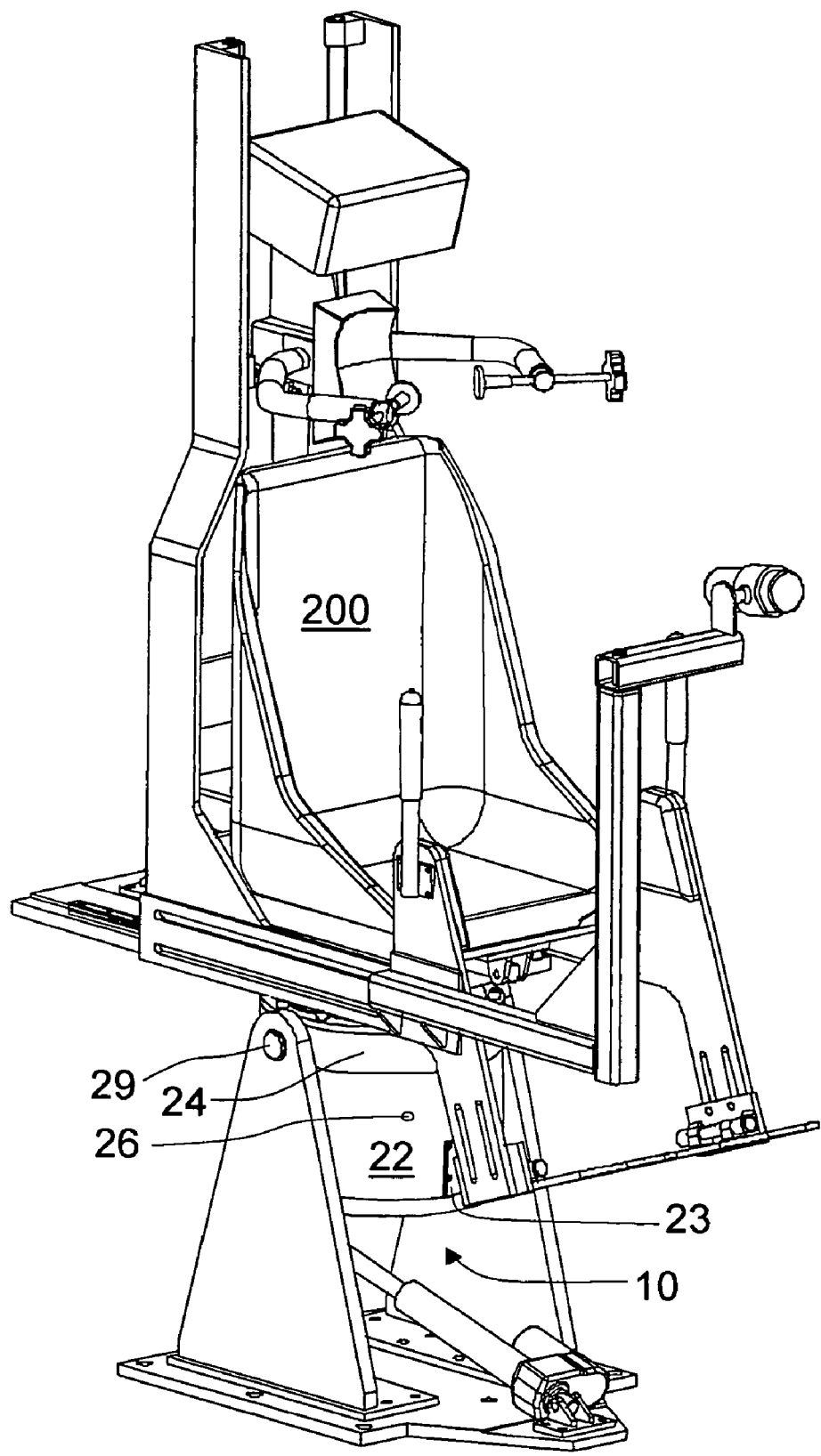
FIG. 6 is a perspective view of a modified synchronous motor according to the present invention directly driving a vestibular system testing chair.

The invention contemplates the addition of a pump 27 of a coolant circulation system 28 (shown schematically) mounted within the housing 20 and mechanically driven by the rotor assembly 40 to circulate the cooling flow. In this manner the motor will be automatically cooled when operating. Additionally the cooling assembly or circuit is self contained. It will be understood that the housing design can be retrofitted to specific applications. For example, as shown in FIG. 6 pivot posts 29 may extend from the housing 20, specifically the bearing housing 24, to easily, pivotally mount the compact motor 10. Another example is in a drilling application where the motor 10 is directly driving a drill chuck, wherein the housing 20 could accommodate a direct connection between the drill chuck and the rotor assembly 40. In this embodiment the motor 10 would appear to be an annular ring around the drill chuck.

The stator assembly 30 includes an outer annular stator housing 32 with cooling grooves 34 therein for circulation of the cooling fluid there through. The cooling fluid is introduced and removed from the grooves through the ports 26. O-rings 36, or other sealing members, are provided on axially opposite sides of the grooves 34. A stator member 38 is adjacent the stator housing 32. The construction of the stator member 38 and the control thereof is known to those of ordinary skill in the art. Stator members for synchronous motors, generally provided as a combined rotor/stator assembly, may be purchased from Etel Motion Technology, Rexroth Indramat and Kohl Morgan.

The rotor assembly 40 includes an outer rotor member 42 that defines a chamber 44 within the rotor member 42. An annular attachment member 46 is at the top of the rotor assembly 40 bolted to the rotor member 42 extending there from to the mounting plate 50. The construction of the rotor assembly 40 and the control thereof is known to those of ordinary skill in the art. The rotor member 42 and the stator assembly 30 are often provided as a set, such as from the vendors listed above.

The rotor shaft 50 (which may also be referred to as a mounting plate) is attached to the attachment member 46 and includes an upper mounting surface 52. The rotor shaft 50 includes a bearing retainer 54. The rotor shaft 50 is designed to have the object 200 being rotated (e.g. a vestibular system testing chair such as shown in FIG. 6) attached directly to the mounting surface 52. Examples of objects that can be mounted to the rotor shaft 50 and directly driven include a machine tool, missile guidance system, radar tracking; oil/well drill, vehicle wheel, assembly table, vestibular testing chair, medical scanning device (e.g. CT-scan), etc. The rotor shaft 50 could be attached to an intervening gearing or the like, but it is preferred that the invention be directly attached to the object being rotated to reduce positioning error. Furthermore, if gearing were desired it is preferable that such gearing be placed in the chamber 44 between the rotor assembly 40 and the rotor shaft 50 to maintain the compact motor design.

The bearing assembly 60 is formed of a pair of angular contact ball bearings 62 positioned between the rotor shaft 50 and the bearing housing 24. The bearings 62 are held in place through the bearing retainers 25 and 54. The ball bearings 62 are positioned between the mounting surface 52 and the rotor assembly 40. The bearings 62 are preferably minimal audible noise and vibration bearings (especially suitable for clinical and military applications), wherein the bearings 62 have an internal bearing construction of at least ABEC 5. The external mounting surfaces of the ball bearings 62 may be of ABEC 1 to simplify bearing construction. Appropriate bearings 62 may be manufactured by Schatz, Bearing Services and Kaydon Corporation.

The slip ring assembly 70 includes mounting support members 72 attached to the stator housing 32 supporting a slip ring 74. The slip ring 74 is positioned at least partially in the chamber 44. The slip ring 74 allows for electrical inputs such as power supply, control and sensor feedback leads to extend from the object being rotated to outside the motor 10. Appropriate leads can extend from the access openings 23 in the housing 20. An appropriate slip ring 74 is manufactured by Airflyte Electronics Company and Litton Poly-Scientific.

The encoder assembly 80 is positioned adjacent the slip ring assembly 70 and used for proper feedback and control of the motor 10. The encoder assembly 80 is between the mounting surface 52 and the base member 21. An appropriate encoder assembly 80 should be absolute encoder (i.e. the encoder knows position when it is turned on and does not need to be calibrated with each power-up) and output signal should be SIN/COSINE. An appropriate encoder assembly 80 may be purchased from Bosch Rexroth Corporation, and Heidenhain Corporation. Additionally, it is contemplated that in the motor 10 the signal from the encoder 80 will be directed to the motor drive controller (not shown) for controlling the position of the rotor assembly 40 in a conventional manner, and simultaneously to a separate data system (e.g. a researchers computer) whereby the separate data system will have real time positioning data for analytical use. This splitting of the encoder output allows for a separate data signal that is independent from the motor drive controller, thereby allowing for improved data acquisition.

Figure 4:
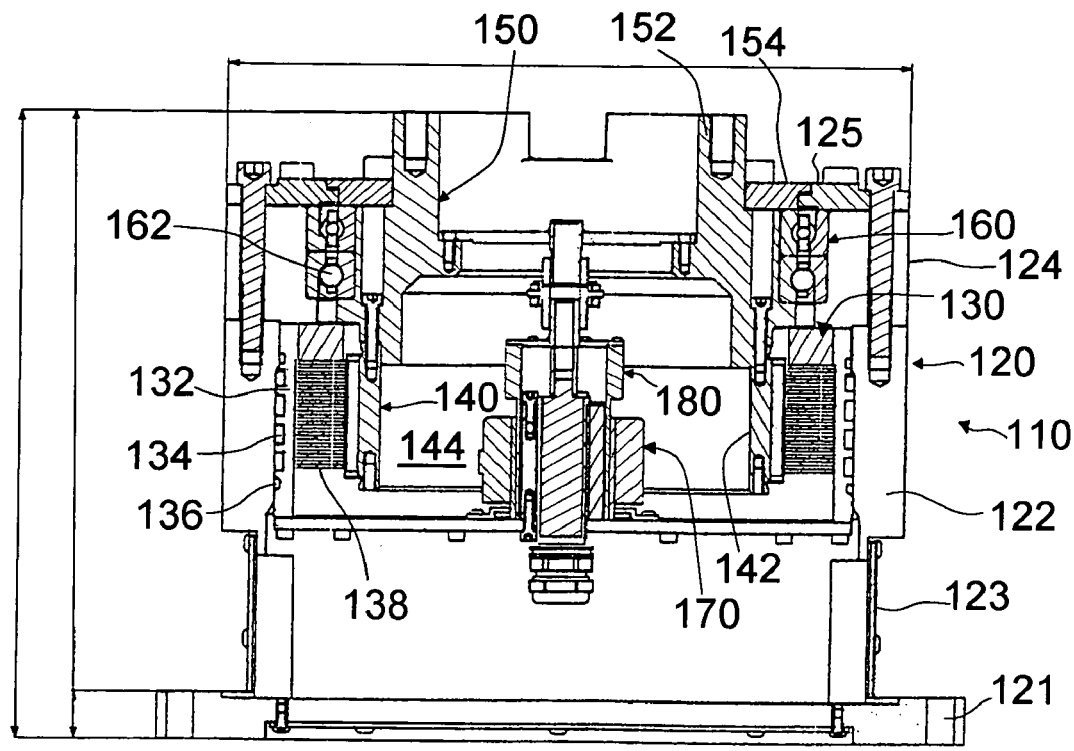
FIG. 4 is a sectional view of a direct drive synchronous motor according to a second embodiment of the present invention.
Figure 5:
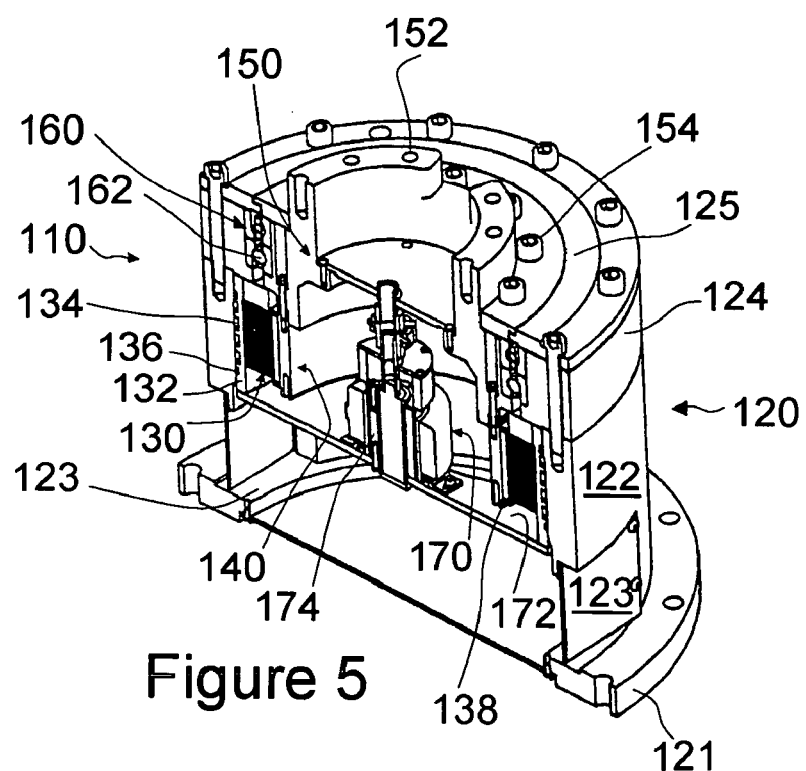
FIG. 5 is a perspective sectional view of the synchronous motor of FIG. 4.

A direct drive synchronous motor 110 according to a second embodiment of the present invention is illustrated in FIGS. 4–5 and operates at up to 340 FT-LBS. The motor 110 is also of compact construction having an outer diameter of less than 15" and a height of less than 16". The synchronous motor 110 includes a housing 120, a stator assembly 130 mounted within the housing 120, a rotor assembly 140 rotationally mounted within the housing 120, a rotor shaft 150 having an upper mounting surface 152 attached to the rotor assembly 140, a bearing assembly 160 coupled to the housing 120 and positioned axially between the rotor assembly 140 and the upper mounting surface 152, a slip ring assembly 170 supported by the housing 120 and positioned axially at least partially within the stator assembly 130 and the rotor assembly 140, and an encoder assembly 180 adjacent the slip ring assembly 170.

The housing 120 is substantially similar to housing 20 and includes a base 121, an annular side 122 with access openings 123, a bearing housing or top 124 bolted to the side 121, and a bearing retainer 125 bolted to the top 124. The side 121 includes two ports (not shown but similar to elements 26 in FIG. 3) for cooling fluid. The stator assembly 130 is similar to the stator assembly 30 and includes an outer annular stator housing 132 with cooling grooves 134, O-rings 136 on opposed sides of the grooves 134, and a stator member 138 adjacent the stator housing 132. The rotor assembly 140 is similar to rotor assembly 40 and includes an outer rotor member 142 that defines a chamber 144 within the rotor member 142.

The rotor shaft 150 (also called a mounting plate) is attached to the rotor member 142 and includes an upper mounting surface 152. The rotor shaft 150 includes a bearing retainer 154 and is designed to have the object 200 (see FIG. 6) being rotated attached directly to the mounting surface 152. The rotor shaft 150 may be attached to an intervening gearing, but preferably directly drives the object 200 being rotated. The bearing assembly 160 is formed of a pair of angular contact ball bearings 162 positioned between the rotor shaft 150 and the top cover 124. The bearings 162 are held in place through the bearing retainers 125 and 154. The ball bearings 162 are positioned between the mounting surface 152 and the rotor assembly 140.

The slip ring assembly 170 includes mounting support members 172 attached to the stator housing 132 supporting a slip ring 174. The slip ring 174 is positioned at least partially in the chamber 142. The encoder assembly 180 is positioned adjacent the slip ring assembly 170 and used for proper feedback and control of the motor 110. The encoder assembly 180 is between the mounting surface 152 and the base member 121 and essentially surrounds the slip ring 174.

FIG. 6 illustrates a motor 10 directly driving an object 200 which is a vestibular testing chair. A vestibular testing chair, such as sold by Neuro Kinetics Inc. allows for diagnostic and evaluative testing to be performed on patient's vestibular system. The testing chair is a controlled rotating, pivoting, adjustable chair with appropriate patient monitoring and stimulus to complete a variety of tests. As discussed above the compact design of the motor 10 and the incorporation of the posts 29 on the housing 20 allow the motor 10 to be easily, pivotally mounted. This is intended to illustrate only one of the various applications of the compact, direct drive, synchronous motor 10 (or 110) according to the present invention. Further diverse applications of the motor 10 or 110 include precision driving of a web press, a missile guiding/radar tracking unit, or astronomical instruments (particularly devices that travel one revolution/day and require very high positioning precision). The invention is not limited to these applications, but these are mentioned t identify the breadth of applications that the motor 10 or 110 is well suited towards.

It will be readily apparent to those of ordinary skill in the art that various changes may be made to the present invention without departing from the spirit and scope thereof. The described embodiment is intended to be illustrative of the present invention and not restrictive thereof. The scope of the present invention is intended to be defined by the appended claims and equivalents thereto.

We claim:

1. A synchronous motor (10, 110) comprises:
   a housing (20, 120);
   a stator assembly (30, 130) mounted within the housing (20, 120);
   a rotor assembly (40, 140) rotationally mounted within the housing (20, 120);
   a rotor shaft (50, 150) having an upper mounting surface (52, 152) and attached to the rotor assembly (40, 140);
   a bearing assembly (60, 160) coupled to the housing (20, 120) and the rotor shaft (50, 150), wherein the bearing assembly (60, 160) is positioned axially between the rotor assembly (40, 140) and the upper mounting surface (52, 152);
   a slip ring assembly (70, 170) supported by the housing (20, 120) and positioned axially at least partially within the stator assembly (30, 130) and the rotor assembly (40, 140); and
   an encoder assembly (80, 180) adjacent the slip ring assembly (70, 170), wherein the outer diameter of the motor (10, 110) is no greater than about 24" and a height of the motor (10, 110) is less than about 20".

2. The motor (10, 110) of claim 1 further including a circulatory fluid cooling system (27, 28) which is driven by the rotor assembly (40, 140).

3. The motor (10, 110) of claim 2 wherein the cooling system (27–28) includes a pump (27) that is mechanically driven by the rotor assembly (40, 140).

4. The motor (10, 110) of claim 1 wherein the bearing assembly (60, 160) includes a pair of angular contact ball bearings (62, 162).

5. The motor (10, 110) of claim 4 wherein the ball bearings (62, 162) have an internal construction of at least ABEC 5.

6. The motor (10, 110) of claim 1 wherein the housing (20, 120) includes a pair of ports (26) for supplying cooling fluid to the motor (10, 110), and wherein the stator assembly (30, 130) includes a stator housing (32, 132) with a plurality of grooves (34, 134) receiving the cooling fluid.

7. The motor (110) of claim 1 wherein the outer diameter of the motor (110) is no greater than about 15" and a height of the motor (110) is less than about 16".

8. The motor (10) of claim 1 wherein the motor (10) has a torque output of up to 3000 Ft-lbs.

9. The motor (10, 110) of claim 1 wherein the housing (20, 120) further includes pivot posts (29) for pivotally mounting the motor (10, 110).

10. A synchronous motor (10, 110) comprises:
    a housing (20, 120);
    a stator assembly (30, 130) mounted within the housing (20, 120);
    a rotor assembly (40, 140) rotationally mounted within the housing (20, 120);
    a rotor shaft (50, 150) having an upper mounting surface (52, 152) attached to the rotor assembly (40, 140);
    a bearing assembly (60, 160) coupled to the housing (20, 120) and to the rotor shaft (50, 150), wherein the bearing assembly (60, 160) is positioned axially between the rotor assembly (40, 140) and the upper mounting surface (52, 152);
    a slip ring assembly (70, 170) supported by the housing (20, 120) and positioned axially at least partially within the stator assembly (30, 130) and the rotor assembly (40, 140); and
    a circulatory fluid cooling system (27, 28) which is driven by the rotor assembly (40, 140) for circulating cooling fluid through the motor.

11. The motor (10, 110) of claim 10 further including an object (200) to be rotated directly mounted to the mounting surface (52, 152), and an encoder assembly (80, 180) adjacent the slip ring assembly (70, 170).

12. The motor (10, 110) of claim 10 wherein the circulatory fluid cooling system (27–28) includes a pump (27) that is mechanically driven by the rotor assembly (40, 140) and wherein the housing (20, 120) includes a pair of ports (26) for supplying the cooling fluid to the motor (10, 110), and wherein the stator assembly (30, 130) includes a stator housing (32, 132) with a grooves (34, 134) receiving the cooling fluid.

13. The motor (10, 110) of claim 10 wherein the bearing assembly (60, 160) includes a pair of angled ball bearings (62, 162), wherein the ball bearings (62, 162) have an internal construction of at least ABEC 5.

14. The motor (10, 110) of claim 10 wherein the motor (10, 110) has a torque output of at least up to 340 Ft-lbs, wherein an outer diameter of the motor (10, 110) is no greater than about 24" and a height of the motor (10, 110) is less than about 20".

15. The motor (10, 110) of claim 10 wherein the housing (20, 120) further includes pivot posts (29) for pivotally mounting the motor (10, 110).

16. A direct drive, synchronous motor (10, 110) comprises:
    a housing (20, 120) having pivot posts (29) extending there from for pivotally mounting the motor (10, 110);
    a stator assembly (30, 130) mounted within the housing (20, 120);
    a rotor assembly (40, 140) rotationally mounted within the housing (20, 120);
    a rotor shaft (50, 150) having an upper mounting surface (52, 152) attached to the rotor assembly (40, 140);
    a bearing assembly (60, 160) coupled to the housing (20, 120) and to the rotor shaft (50, 150), the bearing assembly (60, 160) positioned axially between the rotor assembly (40, 140) and the upper mounting surface (52, 152); and
    a slip ring assembly (70, 170) supported by the housing (20, 120) and positioned axially at least partially within the stator assembly (30, 130) and the rotor assembly (40, 140), wherein a vestibular testing chair is mounted to the mounting surface (52, 152) and wherein the motor (10, 110) has a torque output of at least up to 340 Ft-lbs.

17. The motor (10, 110) of claim 16 wherein an outer diameter of the motor (10, 110) is no greater than about 24" and a height of the motor (10, 110) is less than about 20".

18. The motor (10, 110) of claim 16 wherein the bearing assembly (60, 160) includes a pair of angular contact ball bearings (62, 162), wherein the ball bearings (62, 162) have an internal construction of at least ABEC 5.

* * * * *